June 3, 1930.    R. J. MINSHALL    1,760,881
LANDING HOOK FOR AIRCRAFT
Filed Jan. 16, 1929
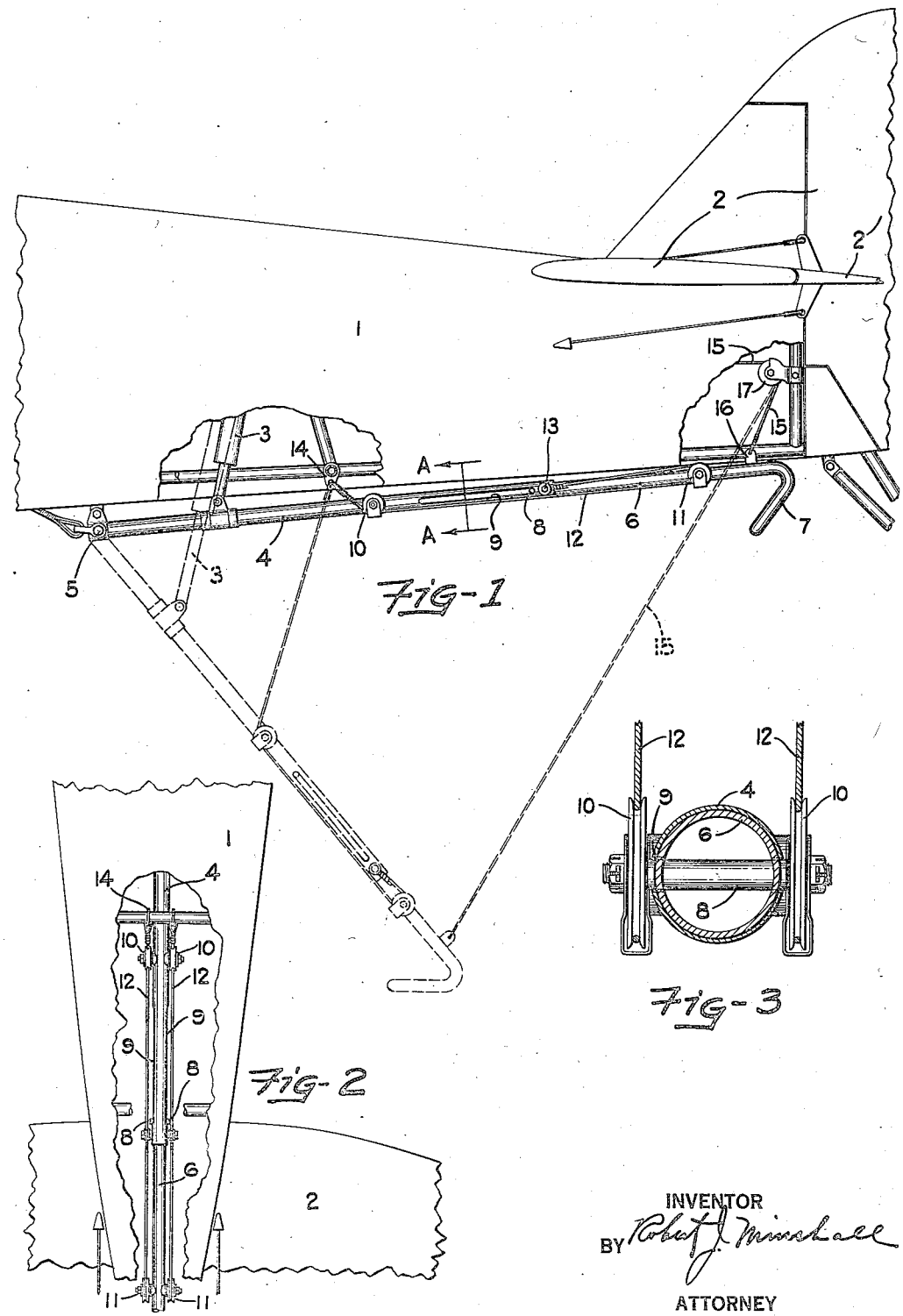
INVENTOR
BY Robert J. Minshall
ATTORNEY Patented June 3, 1930

1,760,881

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON

LANDING HOOK FOR AIRCRAFT

Application filed January 16, 1929. Serial No. 332,780.

This invention relates to improvements in landing hooks for aircraft for engaging with arresting gear as used in restricted landing areas. The principal object of the invention is to provide a hook of this character which will automatically draw the tail of the airplane down toward the arresting gear when the hook has engaged with a portion of the arresting gear, thus preventing the airplane from nosing over. This is accomplished by transforming the line of pull from any position within the limits of the hook movement, in a vertical plane, to a position as close as possible to the bottom of the airplane body, at which position a large down component is created. The greater the pull on the hook, the farther it extends itself toward the rear of the airplane with a resultant increase in the down component.

The present invention also embodies a shock absorbing mechanism as covered by a pending patent application filed September 12, 1928, Serial Number 305,530.

These and other objects will appear as my invention is more fully hereinafter described in the following specification, illustrated in the accompanying drawings, and finally pointed out in the appended claims.

In the drawings:

Figure 1, is a fragmentary side elevation of an airplane fuselage showing my improved form of landing hook in operative engagement therewith.

Figure 2, is a fragmentary plan view of Figure 1.

Figure 3, is an enlarged sectional detail view, taken on the line "A"—"A" of Figure 1.

Referring now more particularly to the drawings:

Reference numeral 1 indicates the fuselage of an airplane. 2 indicates the tail surfaces, such as rudder, stabilizers and elevators. 3 indicates a shock absorbing unit as covered by the pending patent application above referred to. 4 indicates a shaft pivotally connected to the fuselage by any approved form of connection as indicated at 5. The outer end of the shaft is hollow to slidably embrace a hook shank 6 which is formed into a hook proper 7. The hook shank carries a pin 8 for sliding movement in a slot 9 in the shaft. The length of the slot of course governs the extent of the inward and outward movement of the hook shank. A pair of pulleys 10 are pivotally mounted on the shaft 4 and also a pair 11 on the hook shank. A pair of cables 12 are secured to the shaft 4 as at 13 and extend outwardly and around the pulleys 10 and then securely fastened to the fuselage as at 14.

A retrieving cable 15 has one of its ends secured to the hook shank as at 16 and its other end mounted to a hand actuated drum or the like (not shown in the drawings) at a point within convenient reach of the operator. The cable passes over a pulley 17 which is mounted to the tail post of the fuselage. Upon releasing the retrieving cable, the hook will quickly reach its dotted line position due to the expanding action of the shock absorbing unit 3, and will be in proper position for engagement with the arresting gear. Upon such engagement the load applied to the hook will cause the hook to extend and thereby lengthen the distance between the pulleys 10 and 11 thereby absorbing the length of cable between the pulleys 10 and the fuselage attachment point 14. This action will cause the hook to be automatically pulled upwardly to any desired location between the dotted line position and the full line position depending upon the length of the slot 9.

While I have shown a particular form of embodiment of my invention, I am aware that many minor changes therein will readily suggest themselves to others skilled in the art without departing from the spirit and scope of my invention.

Having thus described my invention, what I claim as new and desire to protect by Letters Patent is:—

1. In an airplane, a landing hook yieldingly, swingably and slidably mounted to the fuselage of said airplane, means within the hook shank for creating a tension force between the hook shank and the body of said airplane upon engagement of said hook with the arresting gear, said means consisting of a hook shank that is made of two parts, one of said parts being extendible with respect to the other and a connection extending from said extendible part through the non-extendible part to the body of the airplane.

2. In an airplane, a landing hook yieldingly, swingably and slidably mounted to the fuselage of said airplane, said hook being made of two parts slidably mounted with respect to each other, means interconnecting the parts with each other and both parts to the fuselage of the airplane whereby a pull in one direction on one of said parts will cause radial movement of both of said parts as a unit about their pivot point.

3. In an airplane, a landing hook yieldingly, swingably and slidably mounted to the fuselage of said airplane, said hook being made of two parts slidably mounted with respect to each other, means interconnecting the parts with each other and both parts to the fuselage of the airplane whereby a pull in one direction on one of said parts will cause radial movement of both of said parts as a unit about their pivot point, such movement causing the hook to move toward the fuselage of the airplane.

4. In an airplane, a landing hook yieldingly and swingably mounted to the fuselage of said airplane, the shank of said hook being made of two parts slidably mounted with respect to each other, cables anchored to said fuselage and embracing a plurality of pulleys carried by each of said slidable hook parts.

In testimony whereof I affix my signature.

ROBERT J. MINSHALL.